(12) United States Patent
Lackman et al.

(10) Patent No.: US 9,232,875 B2
(45) Date of Patent: Jan. 12, 2016

(54) LOW OIL VOLUME FRYER WITH SMALL COLD ZONE

(75) Inventors: Lamont Eric Lackman, Keithville, LA (US); Charles Milton Hutchinson, Shreveport, LA (US)

(73) Assignee: Restaurant Technology, Inc., Oak Brook, IL (US)

( * ) Notice: Subject to any disclaimer, the term of this patent is extended or adjusted under 35 U.S.C. 154(b) by 1199 days.

(21) Appl. No.: 11/904,448

(22) Filed: Sep. 27, 2007

(65) Prior Publication Data

US 2009/0013877 A1    Jan. 15, 2009

Related U.S. Application Data

(60) Provisional application No. 60/959,259, filed on Jul. 12, 2007.

(51) Int. Cl.
*A47J 37/12*    (2006.01)

(52) U.S. Cl.
CPC ............ *A47J 37/129* (2013.01); *A47J 37/1285* (2013.01); *A47J 37/1242* (2013.01)

(58) Field of Classification Search
CPC . A47J 37/1285; A47J 37/129; A47J 37/1242; A47J 37/12; A47J 37/1241; A47J 37/1257; A47J 37/1561; A47J 37/1271; A47J 37/1276; A47J 37/1295
USPC ........... 99/324, 403, 330, 336, 345, 355, 359, 99/331, 342, 407–409, 413, 444, 450, 99/418; 220/573.1, 573.4, 912; 126/373.1, 126/25 R; 219/438, 415; 426/438, 523
See application file for complete search history.

(56) References Cited

U.S. PATENT DOCUMENTS 2,698,092 A  * 12/1954  Morton ......................... 210/149
3,314,416 A  *  4/1967  Wagner ......................... 126/369
3,809,062 A  *  5/1974  Moore et al. .................. 126/369

(Continued)

FOREIGN PATENT DOCUMENTS

EP       1224895         7/2002
EP       1224895 A1      7/2002

(Continued)

OTHER PUBLICATIONS

Decision to Refuse European Patent Application dated Mar. 19, 2012 for corresponding European Patent Application No. 08157165.5.

(Continued)

*Primary Examiner* — Dana Ross
*Assistant Examiner* — Brandon Harvey
(74) *Attorney, Agent, or Firm* — Hinshaw & Culbertson LLP

(57) ABSTRACT

A fryer pot for a deep fryer having a pair of opposed sidewalls, a pair of opposed end walls and a bottom wall. Each of the pair of opposed sidewalls has three successive vertical portions. Wherein each of the three successive vertical portions of each of the pair of opposed sidewalls is inboard of a preceding vertical portion to thereby taper the fryer pot towards the bottom wall. A fryer pot for a deep fryer having a pair of opposed endwalls and a pair of opposed sidewalls and a bottom wall. Each of the pair of opposed endwalls has a first vertical portion and a second vertical portion that are each connected by an angled offset portion to decrease a volume of the fryer pot.

34 Claims, 4 Drawing Sheets

(56) References Cited

U.S. PATENT DOCUMENTS

| | | | | |
|---|---|---|---|---|
| 3,870,859 | A * | 3/1975 | Price | 219/437 |
| 3,889,724 | A * | 6/1975 | Anthony | 141/1 |
| 4,481,873 | A * | 11/1984 | Keating | 99/403 |
| 4,668,390 | A * | 5/1987 | Hurley et al. | 210/103 |
| 4,848,318 | A | 7/1989 | Brewer | 126/390 |
| 4,895,137 | A * | 1/1990 | Jones et al. | 126/391.1 |
| 5,033,368 | A | 7/1991 | Brewer | |
| 5,038,753 | A * | 8/1991 | Yokoyama et al. | 126/391.1 |
| 5,059,954 | A | 10/1991 | Beldham et al. | |
| 5,611,330 | A | 3/1997 | Corliss et al. | |
| 5,722,289 | A | 3/1998 | Carr | |
| 6,736,130 | B2 * | 5/2004 | Takahashi | 126/391.1 |
| 6,960,078 | B2 * | 11/2005 | Takeda et al. | 126/390.1 |
| 2001/0050005 | A1 * | 12/2001 | Wang | 99/422 |
| 2003/0222089 | A1 * | 12/2003 | Hale | 220/912 |
| 2005/0194184 | A1 * | 9/2005 | Gleitman | 175/45 |

FOREIGN PATENT DOCUMENTS

| | | |
|---|---|---|
| EP | 1319358 | 6/2003 |
| EP | 1319358 A1 | 6/2003 |

OTHER PUBLICATIONS

Summons to Attend Oral Proceedings dated Dec. 16, 2011 for corresponding European Patent Application No. 08157165.5.
European Office Action dated May 26, 2011 for corresponding European Patent Application No. 08157165.5.
European Office Action dated Dec. 23, 2010 for corresponding European Patent Application No. 08157165.5.
European Office Action dated Jun. 7, 2010 for corresponding European Patent Application No. 08157165.5.
European Office Action dated Jan. 12, 2010 for corresponding European Patent Application No. 08157165.5.
Extended European Search Report dated Oct. 8, 2008 for corresponding European Patent Application No. 08157165.5.
Chinese Office Action dated Mar. 7, 2012 for corresponding Chinese Patent Application No. 200810099668.0 with English translation.
Chinese Office Action dated Nov. 22, 2011 for corresponding Chinese Patent Application No. 200810099668.0 with English translation.
Chinese Office Action dated May 25, 2011 for corresponding Chinese Patent Application No. 200810099668.0 with English translation.
English translation of Mexican Office Action dated Mar. 26, 2012 for corresponding Mexican Patent Application No. MX/a/2008/008726.
English translation of Mexican Office Action dated Nov. 13, 2011 for corresponding Mexican Patent Application No. MX/a/2008/008726.
English translation of Mexican Office Action dated Apr. 22, 2011 for corresponding Mexican Patent Application No. MX/a/2008/008726.
Xi, Dailing, et al., Use and Maintenance of Civil Gas Appliances, National Defense Industry Press, Aug. 1991, pp. 202-204, China.

* cited by examiner

LOW OIL VOLUME FRYER WITH SMALL COLD ZONE

This application claims benefit of U.S. Provisional Patent Application Ser. No. 60/959,259 filed on Jul. 12, 2007, the contents of which are incorporated by reference herein.

BACKGROUND OF THE INVENTION

1. Field of the Invention

The present invention relates to a fryer pot for a gas fryer. More particularly, the present invention relates to a fryer pot for a gas fryer having a low oil volume (LOV) configuration. Still more particularly, the present invention relates to a fryer pot for a gas fryer having a low oil volume configuration that provides a narrowed region in which debris is retained.

2. Description of Related Art

Deep fryers that are used in the commercial cooking industry must be able to quickly heat oil and cook large amounts of food product to meet customers' expectations. Further, the cooking oil must be as free of debris as possible during the cooking process to extend its useful life. However, vendors must balance the customers' expectations with the high cost of cooking oil and fryer pot maintenance issues.

Although various designs of fryer pots have been developed in an effort to improve the overall cooking efficiency and useful life, drawbacks still exist. With an emphasis on rapid food preparation in large quantities of foodstuffs, existing fryer pots are very large and require high volumes of oil for the cooking process. Large volume fryer pots give rise to large heat transfer volumes, cool zone volumes and temperature gradients that present the possibility of induced stress in the fryer pot walls. Stresses on fryer pot walls are further exacerbated by pressure related stresses due to the weight of the large volume of oil that is contained in the fryer pot.

Accordingly, there exists a need for a fryer pot configuration that lowers the volume of required cooking oil while maintaining a sizable opening at the top of the fryer pot and cooking basket and provides a smaller channel at a lower portion thereof for effectively flushing the debris from the cooking oil.

SUMMARY OF THE INVENTION

The present disclosure provides for a fryer pot having a reduced pot capacity in which the capacity is reduced by approximately 40% and the basket opening size is substantially retained.

The present disclosure also provides for a fryer pot having an open pot configuration without internal heat exchanger tubes or cavities and with all internal surfaces readily accessible. Such a configuration reduces the quantity of oil contained in the fryer pot and allows for improved cleaning of internal pot surfaces.

The present disclosure also provides for a fryer pot having a reduced heat transfer and cold zone volumes thereby minimizing expansion induced stresses in the fryer pot walls.

The present disclosure further provides for a fryer pot having offset sidewalls and front and back walls, endwalls, to thereby reduce the volume of the fryer pot.

The present disclosure still further provides for a fryer pot having offset sidewalls and front and back walls, endwalls, to thereby reduce the cold zone at the bottom of the fryer pot.

The present disclosure still yet further provides for a fryer pot having a reduced volume cold zone to reduce the temperature gradient of the oil and form a region where debris can collect and not be recirculated into the cooking oil.

The present disclosure still yet further provides for a pressure switch on a surface of the fryer pot to provide an indication of sufficient oil level for burner activation.

The present disclosure still yet further provides for a reduced temperature gradient across the vertical heat transfer volume to minimize expansion induced stress in the fryer pot walls to lower the likelihood of fracture in service.

These and other further benefits and advantages are achieved by a fryer pot for a deep fryer having a pair of opposed side walls, a pair of opposed end walls and a bottom wall. Each of the pair of opposed sidewalls has three successive vertical portions. Wherein each of the three successive vertical portions of each of the pair of opposed sidewalls is inboard of a preceding vertical portion to thereby taper the fryer pot towards the bottom wall.

A fryer pot for a deep fryer having a pair of opposed endwalls and a pair of opposed sidewalls and a bottom wall. Each of the pair of opposed endwalls has a first vertical portion and a second vertical portion that are each connected by an angled offset portion to decrease a volume of the fryer pot and to taper said fryer pot towards said bottom wall.

A fryer pot for a deep fryer having a pair of opposed sidewalls, wherein each of the pair of sidewalls has three portions. The fryer pot further provides for a pair of opposed endwalls, wherein each of the pair of endwalls has two vertical portions. The fryer pot further provides for a bottom wall wherein the pair of sidewalls and the pair of endwalls are connected to the bottom wall to form a tapered fryer pot having a reduced volume.

BRIEF DESCRIPTION OF THE DRAWINGS

Other and further benefits, advantages and features of the present disclosure will be understood by reference to the following specification in conjunction with the accompanying drawings, in which like reference characters denote like elements of structure.

DETAILED DESCRIPTION OF THE DISCLOSURE

Figure 1:
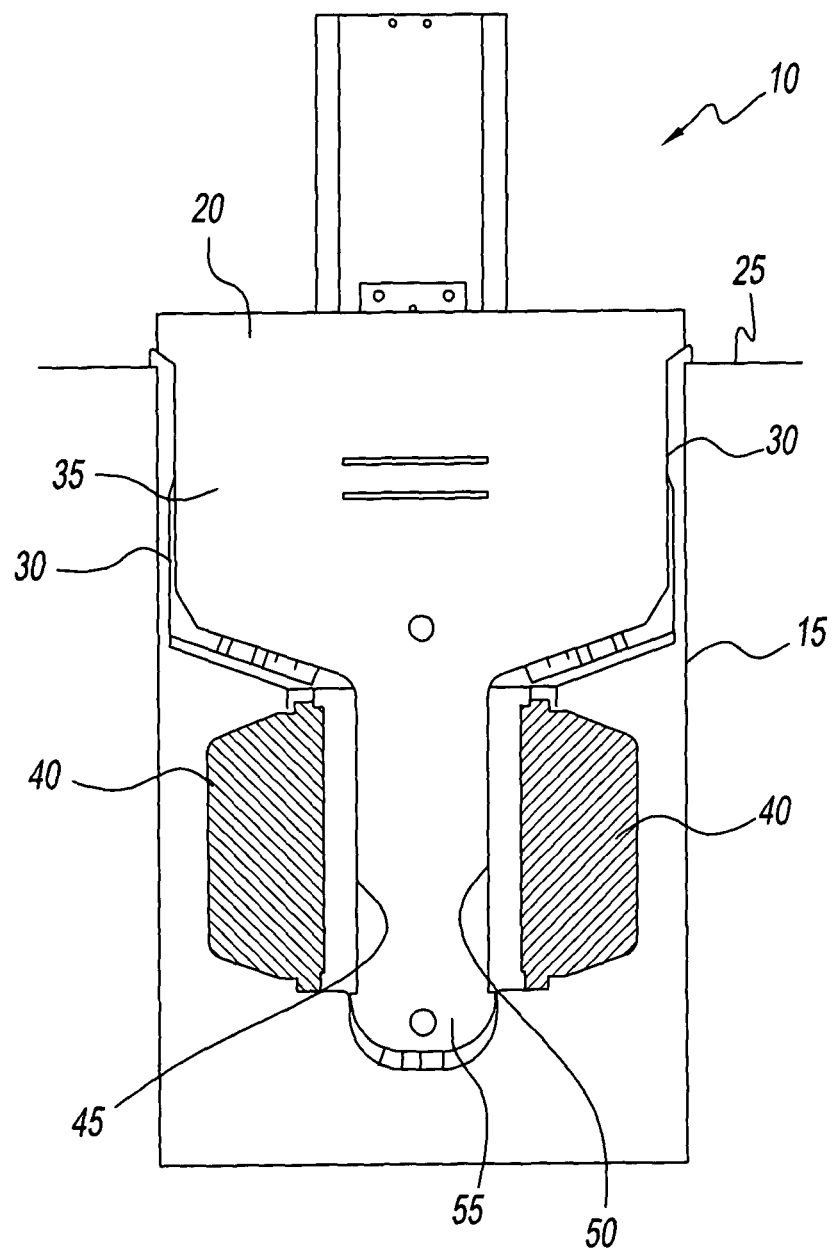
FIG. 1 illustrates a front sectional view of a prior art fryer pot.
Figure 2:
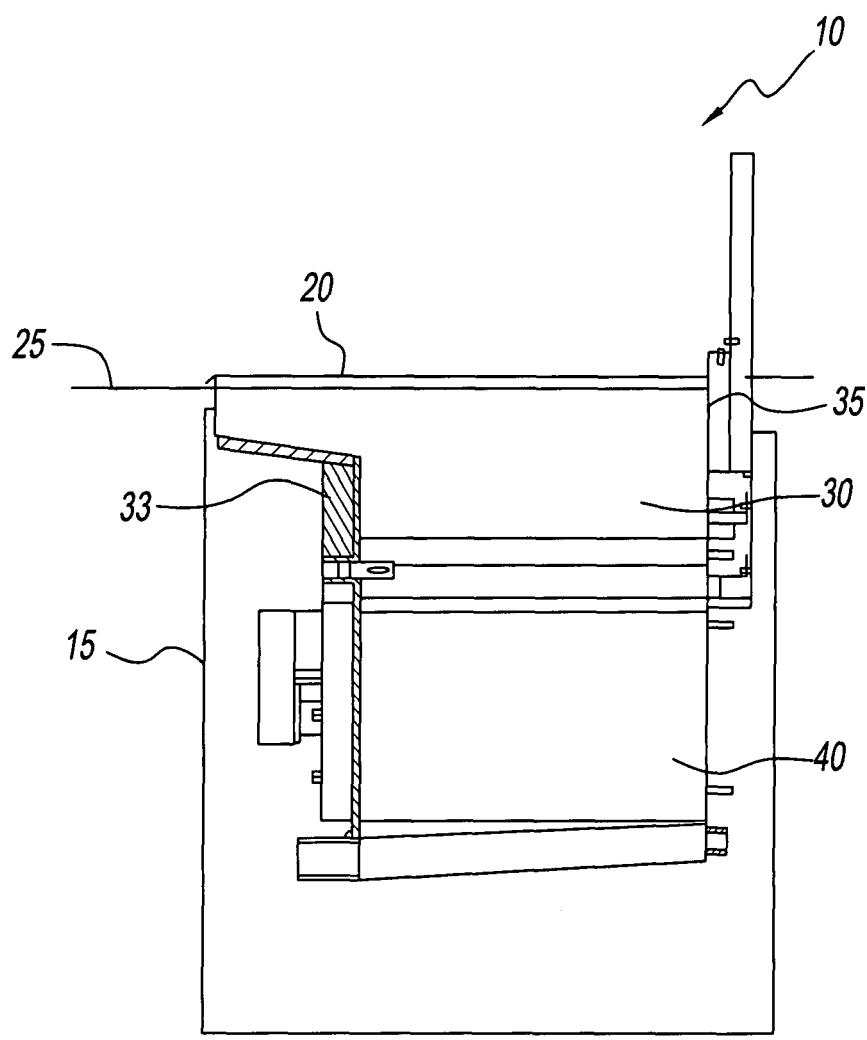
FIG. 2 illustrates a right side sectional view of the prior art fryer pot of FIG. 1.

Referring to FIGS. 1 and 2, there is illustrated a conventional cooking apparatus of the prior art particularly adapted for deep fat frying of food products. The apparatus illustrated is generally designated by the numeral 10 and is of a type used for commercial cooking purposes such as in fast food restaurants and other food service establishments. The apparatus 10 includes a generally rectangular uninsulated metal cabinet 15 forming an enclosure for a fryer pot assembly 20. Fryer pot assembly 20 is adapted to be removably inserted in the cabinet 15 and suitably supported by a top wall 25. Fryer pot assembly 20 includes opposed sidewalls 30 and opposed front and rear walls 33 and 35, respectively. Front wall 33 is inboard relative to front edge of fryer pot assembly 20. Rear wall 35 is essentially vertical along its length. Opposed sidewalls 30 include lower vertical portions 45 and 50 that form a relatively narrow chamber 55 called a cold zone to minimize circulation of cooking debris during use. The four walls including sidewalls 30, front wall 33 and rear wall 35 form an opening sized to accommodate a fryer basket. Also contained within cabinet 15, are burners 40 on opposite sides of fryer pot assembly 20.

While the above described prior art fryer pot assembly 20 is commonly used, it has several drawbacks. Fryer pot assembly 20 is sized to hold approximately 50 pounds of cooking oil. The fryer pot assembly must be filled to a relatively high level in the pot to fill the cooking region occupied by a fryer basket. Accordingly, fryer pot assembly 20 requires a large volume of oil to be used. Further, such a volume of oil causes not only thermal expansion induced stress due to thermal gradients but also stresses due to the weight of oil contained within the fryer pot assembly 20. The high thermal gradient within the oil itself further limits its useful life. The large cold zone while relatively narrow collects debris from the cooking process, however, it is not so confined that the insertion and removal of baskets prevent the debris from being recirculated into the cooking oil. The useful life of the cooking oil is thus reduced due to repeated degradation from the debris.

Figure 3:
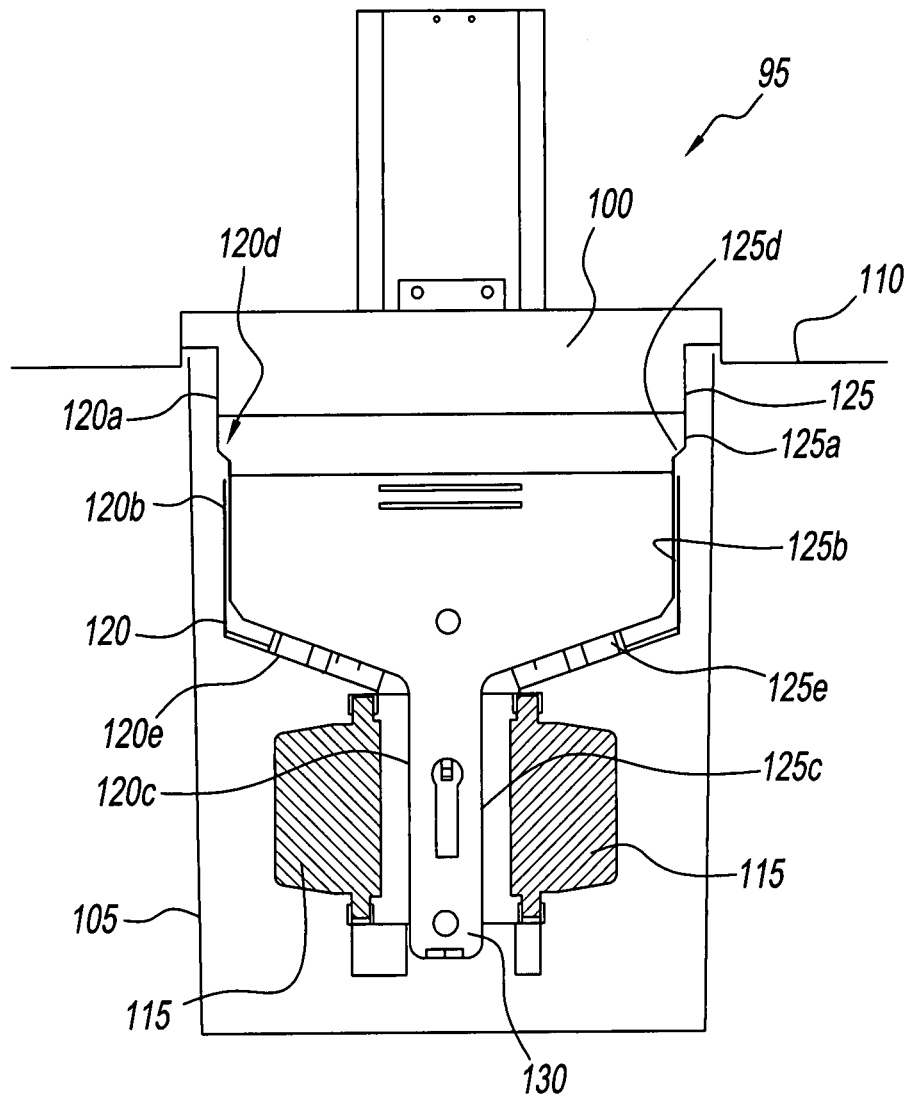
FIG. 3 illustrates a front sectional view of the fryer pot according to the present invention.
Figure 4:
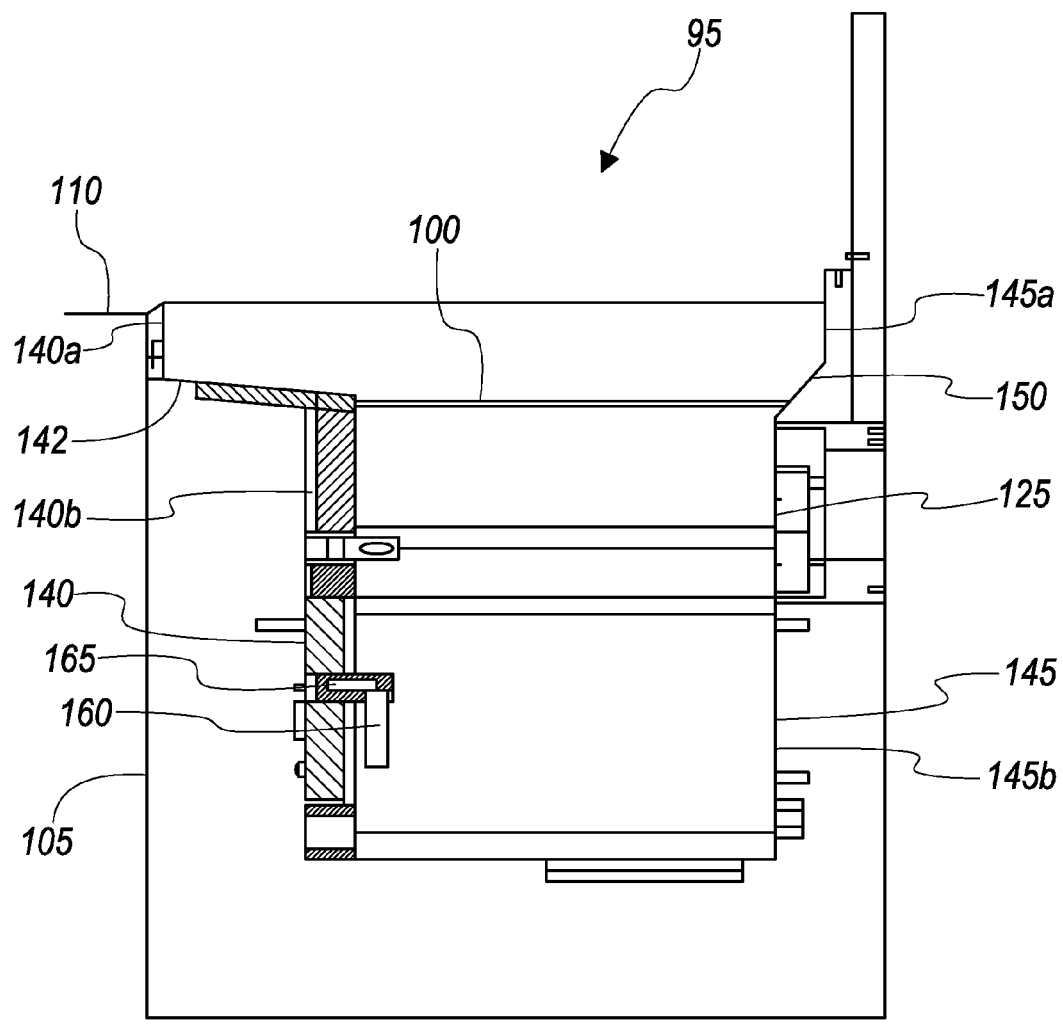
FIG. 4 illustrates a side sectional view of the fryer pot of FIG. 3 according to the present invention.

Referring to FIGS. 3 and 4, a deep fryer assembly of the present invention is shown, and generally referenced using reference numeral 95. Deep fryer assembly 95 contains a fryer pot 100 that is contained in an uninsulated metal cabinet 105. The fryer pot 100 is adapted to be removably inserted into cabinet 105 and suitably supported by a top wall 110. Deep fryer assembly 95 also has burners 115 on opposite sides of fryer pot 100 that are also contained within cabinet 105. By having burners 115 outside of fryer pot 100 the overall open pot configuration is maintained. Conventional fryer pots often are configured with heat exchanger tubes submersed within the cooking oil of the fryer pot. Overall fryer pot operation is maintained by a control system having a controller.

Fryer pot 100 also includes opposed sidewalls 120 and 125, similar to the conventional fryer pot shown in FIGS. 1 and 2. However, sidewalls 120 and 125 each include three vertical portions 120a, 120b, 120c and 125a, 125b and 125c, respectively. Sidewalls 120 and 125 have offsets 120d and 120e and 125d and 125e, respectively. Offsets 120d, 120e, 125d and 125e reduce the overall width of fryer pot 100. As illustrated in FIGS. 3 and 4, offset 120d, 120e, 125d, and 125e are straight inwardly angled offset portions of sidewalls 120 and 125, respectively. Sidewalls 120 and 125 form a relatively narrow chamber 130 or a cold zone to minimize circulation of cooking debris during use. Because of the offsets 120d, 120e, 125d and 125e, the width of cold zone 130 is narrower than the cold zone of the conventional fryer pot assembly 20. Thus, debris is more effectively trapped in cold zone 130 is easily flushed and cannot easily be recirculated during use.

Referring to FIG. 4, fryer pot 100 has a pair of endwalls, a front wall 140 and a rear wall 145. Front wall 140 is similar to the front wall of the conventional fryer pot shown in FIGS. 1 and 2 in that it has vertical portions 140a and 140b connected by an offset 142 that is angled relative to both 140a and 140b; however, front wall portion 140b is more inboard relative to the front of cabinet 105 than front wall 33 is relative to cabinet 15. Rear wall 145 has two vertical portions 145a and 145b. Vertical portions 145a and 145b are connected by an offset 150 that is angled relative to both 145a and 145b. Offsets 142 and 150 reduce the overall depth of fryer pot 100 from both the front and the rear of directions. Thus, while the walls of fryer pot 100 are offset to form a smaller volume pot, the passage for a fryer basket is not substantially reduced to prevent proper operation. Further, the smaller cold zone 130 formed from both sides of fryer pot 100 reduces the thermal gradient between cold zone 130 and the cooking region of fryer pot 100. The smaller cold zone reduces the thermal stresses that are experienced along pot walls.

Additionally, fryer pot 100 includes a pressure switch sensor for determining when there is sufficient oil in fryer pot 100 to activate burners 115. Fryer pot 100 includes a standpipe 160 in front wall 140. Standpipe 160 includes a pressure switch 165 that is positioned to build pressure after the oil rises above the lower opening of the pipe during refill after a filter sequence. Once the oil is sufficiently deep to cover the heat transfer areas, pressure switch 165 signals the control system that it is safe to activate burners 115. Standpipe 160 is positioned such that the pressure measured is approximately 5 to 8 inches of water column which is easily detected by standard industrial sensors but allows the standpipe to be located high enough that food fall off during cooking does not impact its operation.

The present invention having been thus described with particular reference to the preferred forms thereof, it will be obvious that various changes and modifications may be made therein without departing from the spirit and scope of the present invention as defined in the disclosure.

We claim:

1. A fryer pot contained in a cabinet of a deep fryer, comprising:
 a pair of opposed sidewalls, comprising a first sidewall and a second sidewall opposed to the first sidewall, each of said first and second sidewalls having successive vertical portions including a first vertical portion, a second vertical portion and a third vertical portion, in which the first vertical portion of the first sidewall is opposed to the first vertical portion of the second sidewall, the second vertical portion of the first sidewall is opposed to the second vertical portion of the second sidewall and the third vertical portion of the first sidewall is opposed to the third vertical portion of the second sidewall, said first vertical portion of the first sidewall is connected to the second vertical portion of the first sidewall by a first inwardly angled offset portion, the second vertical portion of the first sidewall is connected to the third vertical portion of the first sidewall by a second straight inwardly angled offset portion, said first vertical portion of the second sidewall is connected to the second vertical portion of the second sidewall by a third inwardly angled offset portion, and the second vertical portion of the second sidewall is connected to the third vertical portion of the second sidewall by a fourth straight inwardly angled offset portion, and each of the first vertical portions of the first and second sidewalls having a top end;
 a pair of opposed endwalls comprising a rear endwall and a front endwall, each of the endwalls having a top end and the front endwall having a first vertical portion that is inboard of the cabinet, and the rear endwall having a first vertical portion and a second vertical portion, the first vertical portion of the rear endwall being adjacent the top end of the rear endwall and the first vertical portion and the second vertical portion of the rear endwall being connected by a fifth inwardly angled offset portion;
 a bottom wall, each of the third vertical portions of the sidewalls being adjacent the bottom wall, and the second vertical portion of the rear endwall and the first vertical portion of the front endwall being adjacent to the bottom wall;
 a top opening to the fryer pot adjacent the top ends of the endwalls and the sidewalls, the top opening providing an area for receiving a fryer basket therethrough for placement of the fryer basket into an interior volume of the fryer pot;

a cooking region in the interior volume of the fryer pot wherein the fryer basket is placeable through the top opening of the fryer pot for cooking food contained in the fryer basket in the cooking region with heated cooking oil contained in the fryer pot, the cooking region being contained within the first vertical portion of the front endwall, the second vertical portion of the rear endwall and the second vertical portions of the first and second sidewalls, the cooking region being spaced downwardly from the top ends of the sidewalls and endwalls, and the first, third and fifth inwardly angled offset portions reduce the volume of the cooking region; and a cold zone in the interior volume of the fryer pot positioned downwardly from the cooking region, the cold zone defined by the first vertical portion of the front endwall, the second vertical portion of the rear endwall, and the third vertical portions of the first and second sidewalls, and the second straight inwardly angled offset portion of the first sidewall and the fourth straight inwardly angled offset portion of the second sidewall for reducing the volume of the cold zone, the cold zone extending from the first vertical portion of the front endwall to the second vertical portion of the rear endwall, the cold zone dimension between the first sidewall and the second sidewall being smaller than the cold zone dimension between the front endwall and the rear endwall.

2. The fryer pot according to claim 1, wherein the front endwall includes a second vertical portion positioned above the first vertical portion of the front endwall, the second vertical portion of the front endwall having a top end and wherein the top end of the front endwall is the top end of the second vertical portion of the front endwall wherein each of said pair of opposed endwalls is configured to taper said fryer pot towards said bottom wall, and the first, second and third vertical portions of the first and second sidewalls and the first and second vertical portions of the rear and front endwalls are inside walls of the fryer pot.

3. The fryer pot according to claim 2, wherein the second vertical portion of the front endwall is connected to the first vertical portion of the front endwall by an inwardly angled sixth offset portion.

4. The fryer pot according to claim 3, wherein the sixth inwardly angled offset portion is for reducing the volume of the cooking region, and at least a portion of the sixth inwardly angled offset portion being at the same horizontal level as the fifth inwardly angled offset portion for directing and guiding the fryer basket into the cooking region as it is lowered into the cooking region, and the third vertical portion of the first sidewall and third vertical portion of the second sidewall are respectively spaced inwardly the same distance from the second vertical portion of the front endwall and the second vertical portion of the second sidewall, and at least a portion of the first inwardly angled offset portion and at least a portion of the third inwardly angled offset portion are at the same horizontal level as the fifth inwardly angled offset portion for cooperating with the fifth inwardly angled offset portion and the sixth inwardly angled offset portion for guiding and centering the fryer basket being lowered in to the cooking region.

5. The fryer pot according to claim 1 further comprising a pair of burners disposed on opposite sides of the cold zone.

6. The fryer pot according to claim 2, wherein said front endwall further comprises a standpipe.

7. The fryer pot according to claim 6, wherein said standpipe further comprises a pressure switch that is capable of sensing a predetermined pressure from cooking oil in said fryer pot.

8. The fryer pot according to claim 7, where a controller operatively associated with the deep fryer is capable of activating a pair of burners after sensing said predetermined pressure from the cooking oil in said fryer pot.

9. The fryer pot according to claim 5, wherein said burners are external to said fryer pot to maintain an open pot configuration.

10. A fryer pot contained in a cabinet of a deep fryer comprising:

a pair of opposed sidewalls, comprising a first sidewall and a second sidewall opposed to the first sidewall, each of said first and second sidewalls comprises successive vertical portions comprising a first vertical portion, a second vertical portion and a third vertical portion, wherein the first vertical portion of the first sidewall is opposed to the first vertical portion of the second sidewall, the second vertical portion of the first sidewall is opposed to the second vertical portion of the second sidewall and the third vertical portion of the first sidewall is opposed to the third vertical portion of the second sidewall, said first vertical portion of the first sidewall is connected to the second vertical portion of the first sidewall by a first inwardly angled offset portion, the second vertical portion of the first sidewall is connected to the third vertical portion of the first sidewall by a second straight inwardly angled offset portion, said first vertical portion of the second sidewall is connected to the second vertical portion of the second sidewall by a third inwardly angled offset portion, and the second vertical portion of the second sidewall is connected to the third vertical portion of the second sidewall by a fourth straight inwardly angled offset portion, and each of the first vertical portions of the first and second sidewalls having a top end;

a pair of opposed endwalls comprising a rear endwall and a front endwall, each of the endwalls having a top end, the rear endwall having a first vertical portion and a second vertical portion wherein the first vertical portion of the rear endwall is adjacent the top end of the rear endwall and the first vertical portion and the second vertical portion of the rear endwall are connected by a fifth inwardly angled offset portion, and the front endwall has a first vertical portion and a second vertical portion wherein the first vertical portion of the front endwall is adjacent the top end of the front endwall and the first vertical portion and the second vertical portion of the front endwall are connected by a sixth inwardly angled offset portion;

a bottom wall wherein each of the third vertical portions of the sidewalls are adjacent to the bottom wall, and the second vertical portion of the rear endwall and the second vertical portion of the front endwall are adjacent to the bottom wall;

a top opening to the fryer pot adjacent the top ends of the endwalls and the sidewalls, the top opening providing an area for receiving a fryer basket therethrough for placement of the fryer basket into an interior volume of the fryer pot;

a cooking region in the interior volume of the fryer pot wherein the fryer basket is placed through the top opening of the fryer pot for cooking food contained in the fryer basket into the cooking region, the cooking region being contained within the second vertical portion of the front endwall, the second vertical portion of the rear endwall and the second vertical portions of the first and second sidewalls, the cooking region being spaced downwardly from the top ends of the sidewalls and endwalls, and the first, third, fifth and sixth inwardly angled offset portions reduce the volume of the cooking region; and a cold zone in the interior volume of the fryer pot positioned downwardly from the cooking region, the cold zone defined by the second vertical portion of the front endwall, the second vertical portion of the rear endwall, and the third vertical portion of each of the first and second sidewalls, and the second straight inwardly angled offset portion of the first sidewall and the fourth straight inwardly angled offset portion of the second sidewall for reducing the volume of the cold zone, the cold zone extending from the second vertical portion of the front endwall to the second vertical portion of the rear endwall, the cold zone dimension between the first sidewall and the second sidewall being smaller than the cold zone dimension between the front endwall and the rear endwall.

11. The fryer pot according to claim 10, the first and second vertical portions of the front and rear endwalls form inside walls of the fryer pot, and the first, second and third vertical portions of the first and second sidewalls form inside walls of the fryer pot.

12. The fryer pot according to claim 11, wherein the fifth and sixth inwardly angled offset portions are adjacent a top entrance opening for the cooking region.

13. The fryer pot according to claim 12, wherein the fifth inwardly angled offset portion is opposite the sixth inwardly angled offset portion and at least a portion of the fifth inwardly angled offset portion is at the same horizontal level of the sixth inwardly angled offset portion, the fifth and sixth inwardly angled offset portions providing a downwardly sloped surface for guiding and centering a bottom of the fryer basket lowered for entrance into the cooking region.

14. The fryer pot according to claim 13, wherein the first inwardly angled offset portion is opposite the third inwardly angled offset portion and the first and second inwardly angled offset portions are adjacent a top entrance opening to the cooking region, at least a portion of the first inwardly angled offset portion being at the same horizontal level of the third inwardly angled offset portion, and the first and third inwardly angled offset portions provide a downwardly sloped surface for guiding and centering a bottom of the fryer basket lowered for entrance into the cooking region.

15. The fryer pot according to claim 10, wherein said front endwall further comprises a standpipe.

16. The fryer pot according to claim 15, wherein said standpipe further comprises a pressure switch that is capable of sensing a predetermined pressure from cooking oil in the fryer pot.

17. The fryer pot according to claim 16, where a controller operatively associated with the deep fryer is capable of activating a pair of burners after sensing said predetermined pressure from cooking oil to commence heating, and at least a portion of the fifth inwardly angled offset portion is at the same horizontal level as the first inwardly angled offset portion, and the third inwardly angled offset portion is at the same horizontal level as at least a portion of the fifth inwardly angled offset portion.

18. The fryer pot according to claim 14 further comprising a pair of burners, the cold zone disposed between the pair of burners, wherein said pair of burners are disposed external to said fryer pot to maintain an open pot configuration.

19. A fryer pot contained in a cabinet of a deep fryer comprising:
a bottom wall;
a rear endwall and a front endwall opposed to said rear endwall, wherein each of said rear endwall and said front endwall comprises a first vertical inner portion and second vertical inner portion that are positioned to taper the rear endwall and the front endwall towards the bottom wall; and
a pair of opposed sidewalls comprising a first sidewall and a second sidewall, wherein each of said first sidewall and said second sidewall has a first vertical inner portion, a second vertical inner portion and a third vertical inner portion that are positioned to taper the pot towards the bottom wall;
wherein the second vertical inner portion of the rear endwall, the second vertical inner portion of the front endwall and the third vertical inner portions of the first and second sidewalls are connected to said bottom wall to form a narrowed cold zone; and
a cooking region contained within the second vertical inner portions of the sidewalls, the second vertical inner portion of the rear endwall and the second vertical inner portion of the front endwall, the second vertical inner portions of the first and second sidewalls connected to the third vertical portions by a respective straight inwardly angled portion, the cold zone located beneath the cooking region, the cold zone dimension between the first sidewall and the second sidewall being smaller than the cold zone dimension between the front endwall and the rear endwall.

20. The fryer pot according to claim 19, wherein the first, second and third vertical inner portions of the first sidewall are successive vertical inner portions wherein each of said successive vertical inner portions of the first sidewall is inboard of a preceding vertical inner portion, and the first, second and third vertical inner portions of the second sidewall are successive vertical inner portions wherein each of said successive vertical inner portions of the second sidewall is inboard of a preceding vertical inner portion to thereby taper each of said first sidewall and said second sidewall towards said bottom wall.

21. The fryer pot according to claim 19, wherein the first and second vertical inner portions of the front endwall are successive vertical inner portions wherein the second vertical inner portion of the front endwall is inboard of the first vertical inner portion of the front endwall, and the first and second vertical inner portions of the rear endwall are successive vertical inner portions wherein the second vertical inner portion of the rear endwall is inboard of the first vertical inner portion of the rear endwall to thereby taper each of said front endwall and said rear endwall towards said bottom wall.

22. The fryer pot according to claim 19, said front endwall comprising a standpipe.

23. The fryer pot according to claim 22, wherein said standpipe comprises a pressure switch that is capable of sensing a predetermined pressure from cooking oil in the fryer pot.

24. The fryer pot according to claim 23, wherein a controller operatively associated with the deep fryer is capable of activating a pair of burners after sensing said predetermined pressure from said cooking oil to commence heating.

25. The fryer pot according to claim 19 further comprising a pair of burners disposed external to said fryer pot to maintain an open pot configuration, the third vertical portions being disposed between the pair of burners.

26. The fryer pot of claim 1 wherein the cooking oil capacity is approximately 30 pounds.

27. The fryer pot of claim 3 wherein the cooking oil capacity is approximately 30 pounds.

28. The fryer pot of claim 4 wherein the cooking oil capacity is approximately 30 pounds.

29. The fryer pot of claim 5 wherein the cooking oil capacity is about 30 pounds.

30. The fryer pot of claim 10 wherein the cooking oil capacity is about 30 pounds.

31. The fryer pot of claim 19 wherein the cooking oil capacity is about 30 pounds.

32. The fryer pot according to claim 26 wherein there is a distance between the third vertical portions, the distance between the third vertical portions preventing recirculation of cooking debris from the cold zone into cooking oil in the fryer pot.

33. The fryer pot according to claim 30 wherein there is a distance between the third vertical portions, the distance between the third vertical portions preventing recirculation of cooking debris from the cold zone into cooking oil in the fryer pot.

34. The fryer pot according to claim 31 wherein there is a distance between the third vertical portions, the distance between the third vertical portions preventing recirculation of cooking debris from the cold zone into cooking oil in the fryer pot.

\* \* \* \* \*